United States Patent [19]

Seid et al.

[11] 4,259,886
[45] Apr. 7, 1981

[54] WOOD CUTTER AND LOADER

[76] Inventors: Bobby P. Seid, P.O. Box 235; Laurie P. Hopper, P.O. Box 25, both of Claremont, Va. 23899

[21] Appl. No.: 50,300

[22] Filed: Jun. 20, 1979

[51] Int. Cl.³ .............................................. B27B 5/02
[52] U.S. Cl. ................................... 83/425.2; 83/421; 83/435.2; 144/242 R
[58] Field of Search ................. 83/425.4, 425.3, 425.2, 83/421, 435.2; 144/242 R, 242 B, 242 A

[56] References Cited

U.S. PATENT DOCUMENTS

| | | | |
|---|---|---|---|
| 1,062,175 | 5/1913 | Marten et al. | 83/435.2 |
| 1,082,405 | 12/1913 | Cleveland | 83/425.2 |
| 1,798,570 | 3/1931 | Wahl | 144/242 R |
| 1,969,425 | 8/1934 | Richardson | 83/425.2 |
| 2,569,878 | 10/1951 | Avinger et al. | 83/421 |
| 4,040,459 | 8/1977 | Bush et al. | 83/425.2 |

Primary Examiner—Donald R. Schran
Attorney, Agent, or Firm—Harvey B. Jacobson

[57] ABSTRACT

A trailer mounted wood cutter and loader for cutting tree length material or logs into pulpwood, saw logs, and the like. The wood cutter and loader includes a framework supporting a plurality of conveying and feeding chains having outwardly extending concave log engaging latches thereon for receiving a tree length log and moving it transversely to feed the logs under a plurality of overhead saws with the cut lengths of logs free falling unto a loading conveyor. A spring loaded latch assembly is associated with the saws to catch or engage the tree length material prior to the saws engaging the tree length material. The chain mounted latches combined with the spring loaded latches and a slight upward incline of the conveying and feeding chains co-operate to prevent kickback of the cut length logs and to prevent binding of the logs in relation to the saws. The loading conveyor includes a pair of aligned but spaced conveyors which enables short wood or logs to be discharged from the loading conveyor so that only the desired cut length logs will be carried by the loading conveyor to a truck body or other area adapted to receive the cut length logs.

11 Claims, 6 Drawing Figures

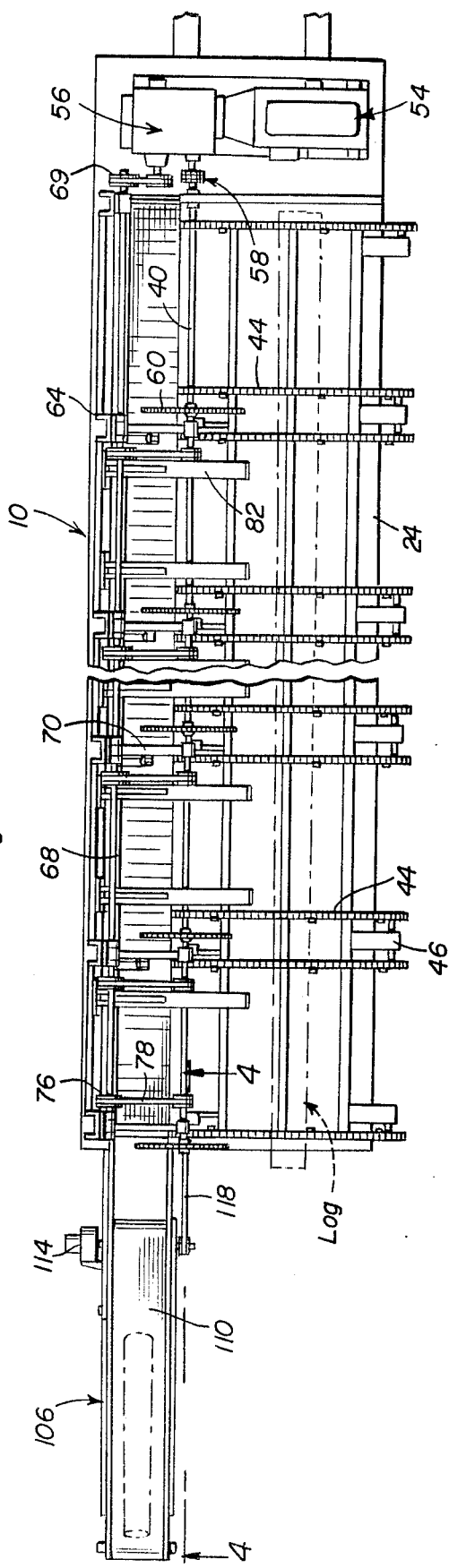
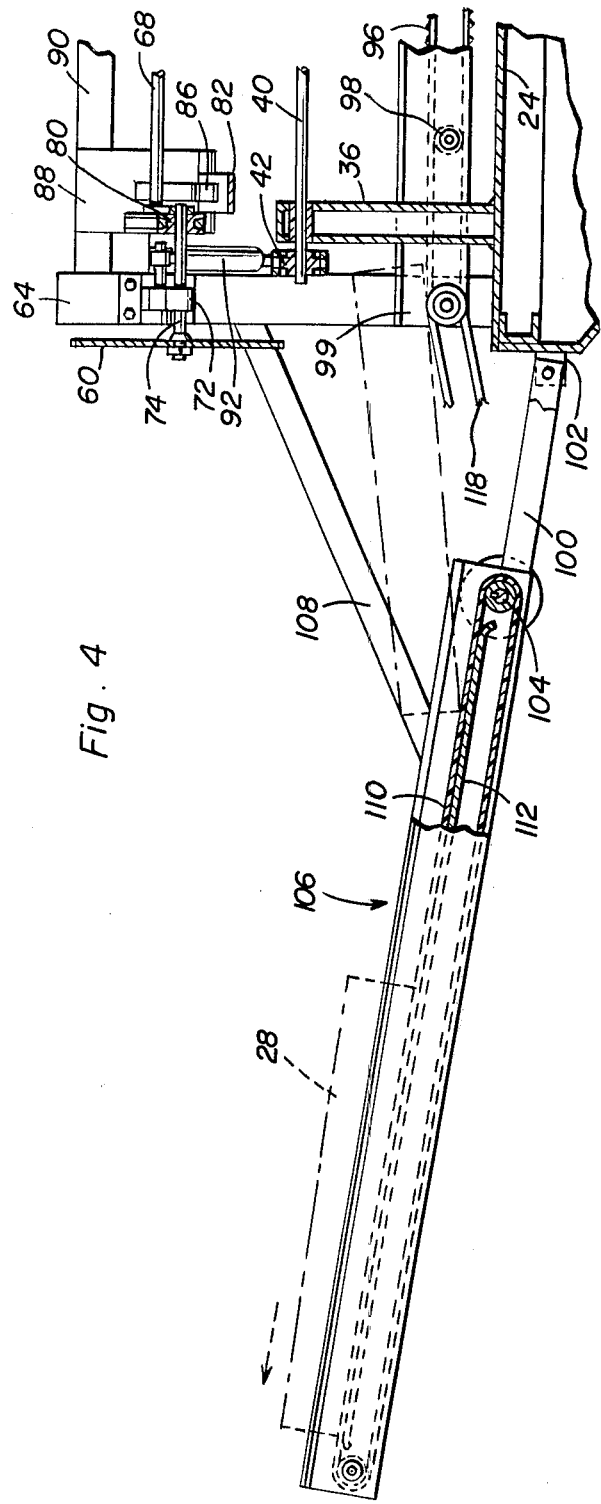
Fig. 2
Fig. 4

WOOD CUTTER AND LOADER

BACKGROUND OF THE INVENTION

1. Field of the Invention

The present invention generally relates to a wood cutter and loader and more particularly a device of this type mounted on a wheeled frame, such as a semi-trailer, or the like, to enable it to be easily driven to a point of use in or adjacent the site at which trees are being cut. The cutter and loader will cut tree length material into pulpwood, saw logs or other predetermined lengths of logs and load them into a truck body, or the like, with power being supplied to the device by the use of a suitable internal combustion engine, pneumatic motors, electric motors, hydraulic motors, or any combination thereof.

2. Description of the Prior Art

Gang saws for cutting an elongated piece of wood into a plurality of shorter pieces have been used in various manners and apparatuses have been provided to cut elongated logs into shorter logs, pulpwood, and the like. The following U.S. patents are those known to be relevant to the subject matter of this invention.

U.S.Pat. Nos. 288,723—Nov. 20, 1883—Murray; 297,395—Apr. 22, 1884—Heyde; 1,082,405—Dec. 23, 1913—Cleveland; 2,361,147—Oct. 24, 1944—Nordstrom; 2,569,878—Oct. 2, 1951—Avinger et al.; 3,111,146—Nov. 19, 1963—Schnepel; 3,329,182—July 4, 1967—Wiesinger; 4,005,625—Feb. 1, 1977—Brochu et al.

SUMMARY OF THE INVENTION

An object of the present invention is to provide a wood cutter and loader for cutting tree length logs into pulpwood, saw logs, or the like, and discharge the pulpwood, saw logs, or the like, at one point and discharge short pieces at a different point.

Another object of the invention is to provide a wood cutter and loader mounted on a wheeled frame, such as a trailer, to enable the device to be towed or driven to a desired site adjacent an area from which trees are being cut.

A further object of the invention is to provide a wood cutter and loader in accordance with the preceding objects, including a plurality of conveyor chains oriented transversely of the rotational axes of a plurality of saws with the chains including upward projections thereon for moving tree length wood material into the saws.

Still another object of the invention is to provide a wood cutter and loader as set forth in the preceding objects in which spring loaded catches are provided for engaging the logs prior to engagement by the saws to prevent kickback and binding with the cut logs free falling onto a loader conveyor as soon as they pass the bottom center point of the saws which are positioned in an overhead relationship to the logs as they are cut.

A still further object of the invention is to provide a wood cutter and loader in accordance with the preceding objects in which the loading conveyor is in the form of a pair of longitudinally aligned and longitudinally spaced belt conveyors with the spacing between the end of one section of the loader conveyor being spaced from the adjacent section of the loading conveyor a distance to discharge short pieces of wood at that point while conveying predetermined lengths of logs to the discharge point of the loading conveyor.

Yet another important object of the present invention is to provide a wood cutter and loader as set forth in the preceding objects in which the saws adjacent the butt end of the tree length log can be elevated to an inoperative position so that a portion of the tree length log may be used as saw logs and the smaller top end of the tree length log may be cut into pulpwood lengths.

Still another significant object of the present invention is to provide a wood cutter and loader in accordance with the preceding objects which is mobile, provided with its own power unit, rugged in construction, efficient in cutting tree length material into predetermined shorter lengths, safe in operation and relatively inexpensive to operate and maintain.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a top plan view with the central portion broken away illustrating the relationship of the components of the invention.

FIG. 4 is a detailed sectional view taken substantially upon a plane passing along section 4—4 of FIG. 2 illustrating the loading conveyor including the space between the segments of the loading conveyor for discharge of short pieces of wood.

FIG. 5 is a fragmental perspective view, on an enlarged scale, illustrating the association of the overhead saws, the inclined conveying chains, the latches on the chains and the spring loaded latches adjacent the saws to prevent kickback of the log and to prevent binding of the log against the saws.

DESCRIPTION OF THE PREFERRED EMBODIMENT

Figure 1:
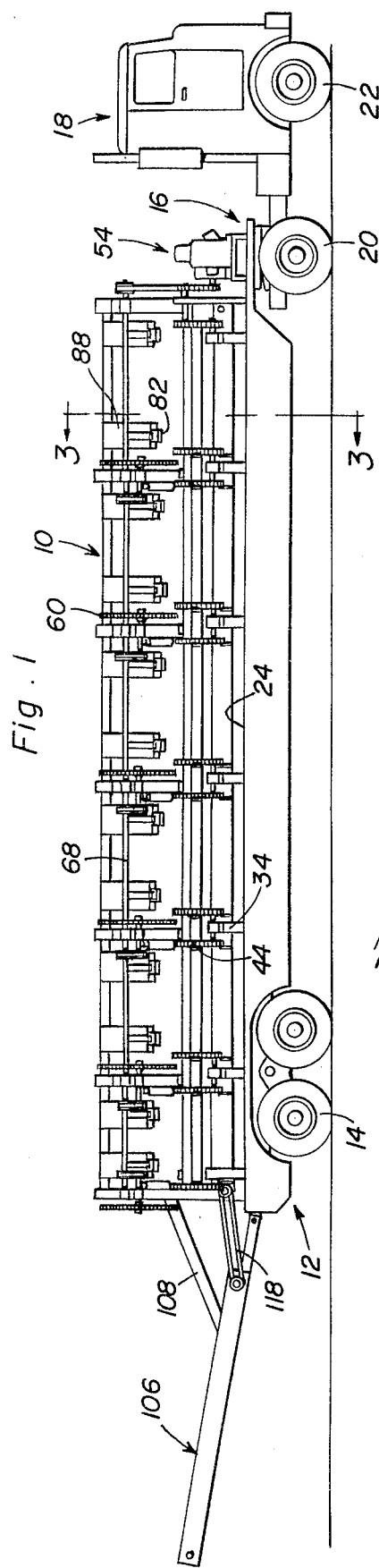
FIG. 1 is a side elevational view of the wood cutter and loader illustrating the manner in which it is mounted on a platform type semi-trailer and tractor assembly.
Figure 6:
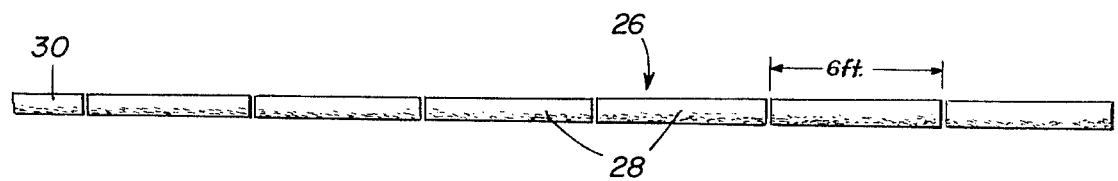
FIG. 6 is a diagrammatic view illustrating the manner in which a tree length log is cut into shorter segments.

Referring now specifically to the drawings, the wood cutter and loader of the present invention is generally designated by reference numeral 10 and, as illustrated in FIG. 1, it is mounted on a platform trailer 12 of conventional construction and including the usual rear tandem wheel assemblies 14 and a forward fifth wheel assembly 16 articulately connecting the platform trailer to a towing tractor vehicle generally designated by numeral 18 which includes the usual rear driving wheels 20 and front steerable wheels 22. The specific construction of the trailer 12 and the towing tractor 18 are conventional and form no specific part of the present invention, except that the trailer 12 includes a platform supporting surface 24 on which the wood cutter and loader 10 of the present invention is mounted to facilitate it being driven to a desired site adjacent an area from which trees are being cut in order to facilitate the tree length material being cut into pulpwood lengths, saw logs, or the like. As illustrated in FIG. 6, an elongated tree length log 26 is illustrated as being cut into six foot pulpwood lengths 28 and the outermost or top end of the tapering tree length log, as designated by numeral 30, being too short to be used as a pulpwood log will be discharged at a point different from the pulpwood length logs 28. Saw logs are formed by elevating certain of the saws adjacent the butt end of the tree length log 26 thereby not forming certain of the cuts. For example, by not making the first cut illustrated in FIG. 6, saw logs having a 12 foot length may be provided or by not making the first two cuts from the butt end of the tree, saw logs of 18 feet in length may be provided. The tree length logs are brought to the site of the wood cutter and loader and placed horizontally onto the wood cutter and loader 10 by use of any suitable grapple device, or the like, with the tree length logs 26 being loaded onto the wood cutter and loader 10 in generally parallel relation to the longitudinal axis of the trailer 12, as illustrated in FIGS. 2 and 3.

The wood cutter and loader includes a rigid framework generally designated by numeral 32 mounted on the platform 24 and includes a plurality of vertical uprights 34 and 36 with the uprights 36 being longer than the uprights 34. The uprights 34 are in alignment with one side edge of the platform 24 and the uprights 36 are spaced inwardly from the opposite side edge of the platform 24 as illustrated in FIG. 3 with the uprights rotatably supporting and journalling a longitudinally extending segmental outer shaft 38 and a longitudinally extending inner shaft 40 each of which has sprocket gears 42 attached thereto with sprocket chains 44 being mounted on and encircling the sprocket gears 42 in the manner illustrated in FIGS. 3 and 5. As illustrated, the upper end of the uprights 34 are provided with outwardly extending cantilevered support brackets 46 supporting the shaft segments 38 outwardly of the side edge of the platform 24 as illustrated in FIG. 3 to facilitate the tree length log 26 being placed onto the chains 44 which serve as a feeding conveyor for conveying the tree length logs 26 transversely of the platform 24 with the difference in elevation between the uprights 34 and 36 providing an upward incline to the path of movement of the tree length logs 26 with this upward incline being approximately 5°.

Figure 3:
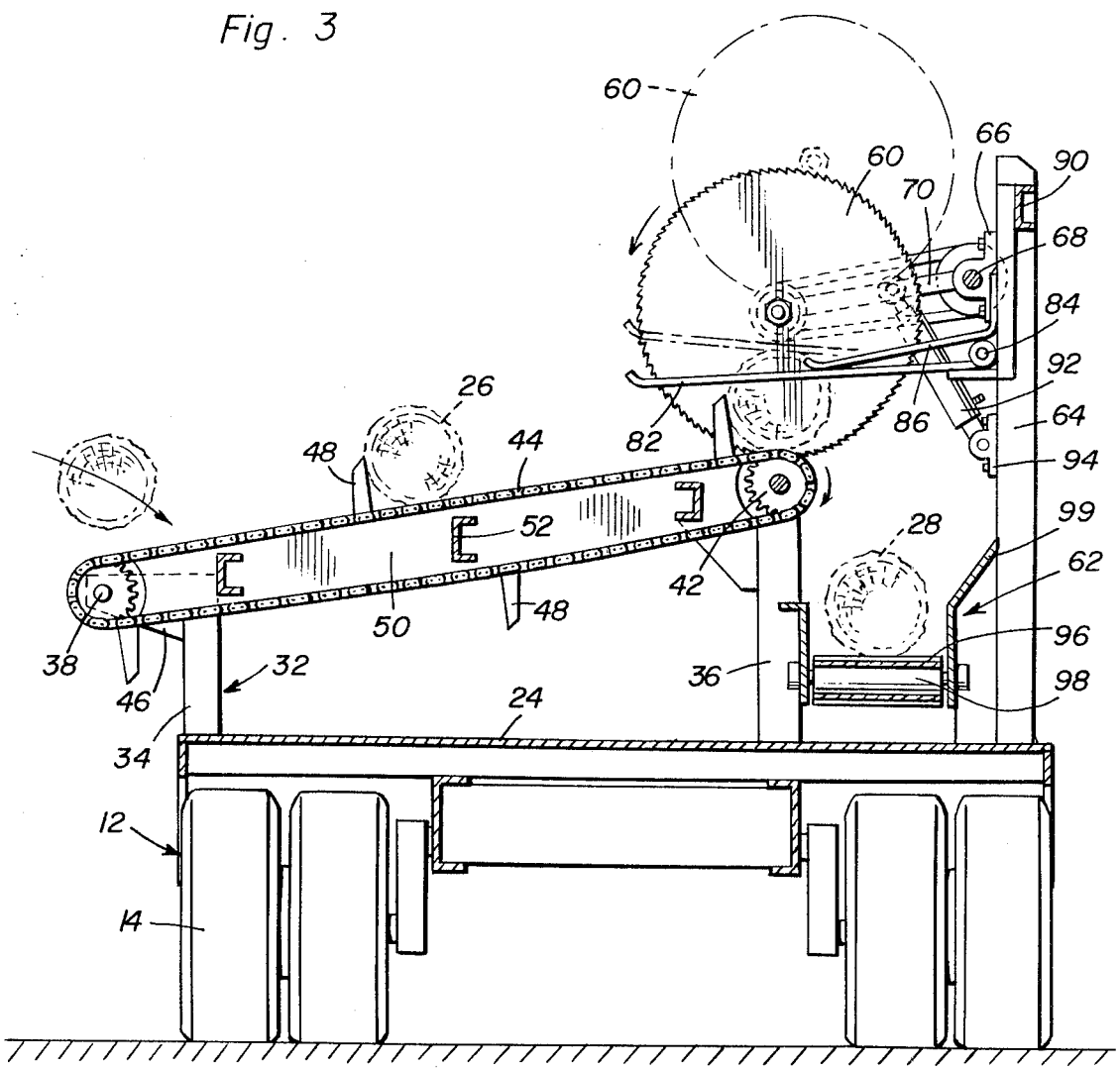
FIG. 3 is a vertical, transverse, sectional view taken substantially upon a plane passing along section line 3—3 of FIG. 1 illustrating the association of components of the wood cutter and loader.

Fixedly attached to each of the chains 44 and extending outwardly therefrom is a latch 48 which has its leading edge perpendicular to the chain in order to engage the outer edge surface of the tree length log 26 as illustrated in FIG. 3 when conveying it inwardly of the platform. The upward incline of the chains 44 assures that the tree length log 26 will roll against and be retained against the latch 48. If desired, the leading edge of the latch 48 may be concave to partially fit around the surface of the log and to more effectively cradle the log with the vertical height of the latches 48 being sufficient to at least extend beyond the center of the largest logs to be handled by the cutter and loader.

The upper run of each of the chains 44 is supported by a plate 50 with a plurality of longitudinal frame members 52 providing a rigid framework 32. As illustrated, the inner shaft 40 is a continuous shaft which is driven at its front end by a prime mover assembly 54 including a reduction gear unit 56 or similar mechanism for providing an output power connection 58 to the shaft 40, which maintains the upper run or flight of the chains 44 in tension and rotates the outer sprocket gears 42 with the outer shaft 38 being segmental with each segment being journalled by the brackets 46 to enable bark or other debris to fall freely between the chains at the outer ends thereof so that a large quantity of such material will fall to the ground alongside of the trailer 12. Inasmuch as the chains 44 all are moving at the same speed, the projections or latches 48 which engage the tree length log 26 will remain aligned and move all parts of the log at the same speed.

Mounted in overlying relation to the inner ends of the chains 44 is a plurality of circular saws 60 having a center of rotation generally aligned with the shaft 40 when in operative position to cut the tree length log 26 into a plurality of shorter log segments 28. As illustrated in FIG. 3, the cut log lengths 28 will free fall off the ends of the conveyor chains 44 immediately after the lower point of the saw blade 60 has passed through the log thereby eliminating any binding of the logs with the saws since the logs will immediately disengage from the saws when they have been cut off. The cut lengths 28 are discharged onto a loading conveyor assembly generally designated by numeral 62 which is disposed longitudinally along the platform 24 below the saws 60 and the discharge ends of the sprocket chains 44.

The saws 60 are supported from vertical uprights 64 mounted on the opposite side edge of the platform 24 from the uprights 34 with the uprights 64 including pillar block bearing 66 supporting a drive shaft 68 for all of the saws 60. The shaft 68 is driven through a belt drive or other drive connection 69 between the output 56 of the prime mover 54 and the shaft 68 to drive the shaft 68 at a desired rotational speed. Also mounted from the shaft 68 is a support arm 70 extending outwardly and terminating in a bearing 72 journalling the stub shaft 74 of a saw blade 60 therein which enables the saw blade 60 to move in a vertical arc about the center of the shaft 68. Also, the shaft 68 includes a drive pulley 76 engaged by a drive belt 78 which in turn encircles a V-belt pulley 80 on the saw blade shaft 74 journalled in the bearing blocks 72 so that each saw is independently driven. Also extending from the vertical member 64 is a spring loaded latch 82 in the form of an elongated bar extending along each side of each saw to engage the top surface of the log 26 as it approaches the saw, as illustrated in FIG. 3. The latch 82 is hingedly supported by a hinge structure 84 and a leaf spring 86 biases the latch 82 downwardly. The latch 82 combined with the latch 48 on the conveyor chain prevents kickback of the log when it is engaged by the saw and serves to guide the log as it moves inwardly in relation to the saw until it free falls off the innerend of the conveyor chains 44. As illustrated in FIG. 5, the hinge structure 84 is supported by bracket 88 affixed to longitudinal frame members 90 and the leaf spring 86 is affixed to the same bracket 88 as by welding, or the like, and the saw blades 60 are mounted on the stub shafts 74 in a conventional manner to enable the saws to be changed when desired. Also, the arms 70 are connected to one end of a diagonally arranged piston and cylinder assembly 92 which has its other end connected to a bracket 94 on the vertical frame members 64 in order to elevate selective ones or all of the arms 70 by extending and retracting the piston and cylinder assembly 92. With this arrangement, any of the saw blades 60 may be rendered inoperative by lifting the saw blade upwardly so that it will not cut the tree length log 26, thereby enabling the length of logs cut off by the saws to be varied within the increments of space between the saws. Also, the saws are provided with heavy wire cages for safety purposes, but such cages are not illustrated in the drawings inasmuch as they will be of conventional construction and similar to the cages used in various types of circular cut off saw arrangements.

The loading conveyor 62 includes an elongated belt conveyor 96 extending along the platform 24 between the uprights 36 and 64 as illustrated in FIG. 3 with the belt conveyor 96 being supported by rollers 98 and provided with side guides 99 so that any segment of log 28 which free falls onto the conveyor belt 96 will be conveyed toward the rear end of the trailer. At the rear of the trailer, a pair of rearwardly extending support member 100 are attached to brackets 102 and attached to a transverse shaft 104 of an upwardly inclined conveyor generally designated by numeral 106 with a brace 108 interconnecting the rearmost upright 64 on the trailer and the conveyor 106 for supporting the conveyor 106 in upwardly inclined position. The braces 108 may be adjustable in length for varying the angular position of the conveyor 106. The conveyor 106 also includes a conveyor belt 110 which may be in the form of a slider supported belt or roller supported belt with a belt supporting slider 112 being illustrated. The conveyor belt 110 is spaced from the end of the conveyor belt 96 so that short logs, having a length less than the distance between the conveyor belt 96 and the conveyor belt 110 will drop downwardly through this space and be discharged at a point different from the cut lengths of logs 28 which will bridge the space, as illustrated in FIG. 4, and thus be discharged at the rear of the conveyor 106 into a truck body or other conveying or storage device. The conveyors 106 and 62 are driven by any suitable power device 114, such as an electric or hydraulic motor, and a V-belt drive, or the like, 118 interconnects the drive shaft 104 of the conveyor 106 and the outermost shaft and roller of the conveyor 62, as illustrated in FIGS. 2 and 4.

In actual practice, the gap between the two loading conveyors 62 and 106 may be approximately 30 inches so that undesired short lengths of logs will be separated from the production logs. Also, the first three saws from the butt end of the tree length log are usually all that are necessary to be lifted up to cut desired saw log lengths and the upper portions of the saws 60 are covered with a heavy-duty cage mesh as a safety feature. The overhead arrangement of the saws not only provides for high production rate, but also prevents a fire hazard from debris and sawdust settling down onto the saws and moving parts. The lower periphery of the saws are placed over the feed chain sprockets so that as soon as the tree length log 26 gets to the point where it will fall off the inner ends of the feed chain, the lengths 28 have been cut, thereby avoiding kickback and binding and reducing friction between the saws and the adjacent surfaces of the kerf formed in the wood. The steady pressure applied by the spring loaded latches also assist in preventing kickback when combined with the concave surfaced chain latches, thereby providing a definite safety feature which also keeps the tree from binding and as soon as the cut lengths of logs 28 have been cut through, they will immediately free fall.

The prime mover or power plant is preferably at the front end of the trailer but may be located in any desired location and may be in the form of a diesel or gasoline powered engine. However, other power combinations may be used, such as air motors, electric motors, hydraulic motors, a combination of these units, or the like.

The various bearings may be sealed units and the overall length of the device may vary depending upon the requirements of individual users. Also, the number of saws may vary and the sizes may vary although it has been found successful to utilize saws having a 36 inch diameter with carbon steel tips driven at approximately 2200 RPM. With this unit, pulpwood or other desired log lengths may be discharged into a dump truck body so that such production logs may then be conveyed to a point of use such as a paper plant, sawmill, of the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A wood cutter and loader comprising a supporting framework, a plurality of spaced and aligned circular saws supported from said framework, a plurality of conveyor chains supported from said framework, means on said chains for engaging a tree length log and moving it toward the saws when the chains are driven, said chains being endless and entrained around end sprockets, one of said sprockets being disposed immediately adjacent the lowest peripheral point of an associated saw, each of said saws including a spring biased log engaging latch extending beyond the periphery of the saw to engage the top surface area of an approaching tree length log to stabilize the log and prevent kickback, loading conveying means supported on said framework at an elevation below the sprocket adjacent the lowest point of the saw to enable cut length logs to free fall onto the loading conveyor means immediately after the saw has cut through the tree length log thereby reducing binding and friction on the saws, and means driving said chains, saws and loading conveying means.

2. The structure as defined in claim 1 wherein said loading conveying means includes a first conveyor segment extending longitudinally below all of the saws and sprockets disposed adjacent thereto and receiving all of the cut length logs, a second conveyor segment spaced from a discharge end of the first conveyor segment and receiving cut length logs therefrom, the spacing between the first and second conveyor segments providing gravity discharge of short logs having a length less than the cut length logs.

3. The structure as defined in claim 2 wherein each of said conveyor segments is a belt-type conveyor, said means driving the loading conveying means including a motor driving one of the conveyor segments and a driving connection between the conveyor segments, said second conveyor segment being upwardly inclined to load cut length logs into a truck body or the like.

4. The structure as defined in claim 3 wherein the saws are equally spaced to cut the tree length logs into pulpwood length cut length logs, and means supporting certain of said saws from the framework to enable movement in a vertical plane to a point above the tree length logs to enable the saws to cut the tree length logs into saw logs.

5. The structure as defined in claim 4 wherein said supporting means for the saws includes an arm pivotally connected to the framework with a saw journalled from the free end thereof, said arms being generally horizontally disposed when the saws are in operative position, and fluid pressure operated piston and cylinder means interconnecting the arms and framework for selectively raising selective saws to an inoperative position.

6. The structure as defined in claim 1 wherein said latch includes an elongated member pivotally supported from the framework and extending generally parallel to the saw and the chains and disposed slightly below the center of the saw, and spring means interconnecting the framework and the elongated member biasing said member downwardly toward the chains.

7. The structure as defined in claim 6 wherein said means on the conveying chains engaging the tree length logs including a plurality of spaced projecting members mounted on each chain with the upper run of the chains being elongated and supported longitudinally thereof to support and carry tree length logs toward the saws.

8. The structure as defined in claim 7 wherein the upper run of the chains are upwardly inclined toward the saws whereby gravity will hold the tree length logs against the projections.

9. The structure as defined in claim 8 wherein the framework is mounted on a mobile vehicle having an elongated support arrangement and means supporting the other sprockets outboard of the side edge of the supporting arrangement to facilitate approach of a tree length log handling mechanism to the loading area of the chains.

10. A wood cutter comprising a supporting framework, a plurality of spaced and aligned circular saws supported from said framework, a plurality of conveyor chains supported from said framework, projections on said chains for engaging a tree length log and moving it toward the saws when the chains are driven, said chains being endless and entrained around end sprockets, one of said sprockets being disposed immediately below the lowest peripheral point of an associated saw to enable cut length logs to move downwardly away from the saws immediately after the saws cut through the tree length log thereby reducing binding and friction on the saws, each of said saws including a log engaging means associated therewith in opposed relation to the chains and projections thereon to engage the top surface of an approaching tree length log to stabilize the log and prevent kickback when the saws are cutting the log and means driving said chains and saws, said log engaging means including an elongated, generally straight bar disposed above the projections on the chains and below the rotational center of the saws, and spring means retaining said bar in position and enabling upward movement thereof when a log engages the bar, said bar extending beyond the periphery of the saws and cooperating with the projections to stabilize the log when engaged by the saws.

11. The wood cutter as defined in claim 10 wherein each of said saws are mounted in overlying relation to the chains, a pivotally supported arm rotatably journaling each of said saws independently, piston and cylinder means connected to each of the arms for raising the saws to an elevated inoperative position to enable variation in the length of the cut log formed when the tree length log is being cut, an elongated conveyor underlying the sprockets disposed immediately below the saws to receive cut length logs therefrom, said conveyor including two segments with one segment underlying all of the saws and the other segment being aligned therewith but in spaced relation thereto with the spatial relationship between the segments of the conveyor enabling discharge of shorter length logs at that point and conveyance of cut length logs to a discharge point, said elongated bar being pivotally supported and provided with a stop member limiting its downward movement to a position generally in spaced parallel relation to the conveyor chains and slightly above the upper ends of the projections on the conveyor chains, said conveyor chains being inclined upwardly toward the saws whereby gravity will hold the tree length logs against the projections and the elongated bars will engage the logs prior to the saw engaging the logs whereby the logs are stabilized by the chains in underlying relation thereto, the projections along the surface remote from the peripheral portion of the saws and by the elongated bars on the top surface of the log, said spring means engaging the elongated bars also serving to exert a downward force on the cut length logs to assure downward movement of the cut length logs as soon as the logs have past the lowest peripheral portion of the saws.

* * * * *